US 7,787,992 B2

(12) United States Patent
Pretlove et al.

(10) Patent No.: US 7,787,992 B2
(45) Date of Patent: Aug. 31, 2010

(54) METHOD TO GENERATE A HUMAN MACHINE INTERFACE

(75) Inventors: John Pretlove, Sandvika (NO);
Charlotte Skourup, Drammen (NO);
Pierre Öberg, Västerås (SE); Thomas Pettersen, Borgenhaugen (NO);
Christoffer Apneseth, Oslo (NO)

(73) Assignee: ABB Research Ltd., Zürich (CH)

( * ) Notice: Subject to any disclaimer, the term of this patent is extended or adjusted under 35 U.S.C. 154(b) by 303 days.

(21) Appl. No.: 11/313,787

(22) Filed: Dec. 22, 2005

(65) Prior Publication Data

US 2006/0241792 A1 Oct. 26, 2006

Related U.S. Application Data

(60) Provisional application No. 60/637,868, filed on Dec. 22, 2004.

(51) Int. Cl.
*G06F 19/00* (2006.01)
(52) U.S. Cl. ......................................... 700/259; 700/66
(58) Field of Classification Search ........... 700/19–194, 700/259–246, 17; 709/202–211, 217, 238; 348/211.8, 169, 335, 207.99; 702/45, 130, 702/138; 715/810, 744; 718/105
See application file for complete search history.

(56) References Cited

U.S. PATENT DOCUMENTS

| 5,032,928 | A | * | 7/1991 | Sakai et al. ................. 358/448 |
| 5,274,456 | A | * | 12/1993 | Izumi et al. ................. 348/335 |
| 5,598,572 | A | * | 1/1997 | Tanikoshi et al. ............. 712/30 |
| 6,122,520 | A | * | 9/2000 | Want et al. ............... 455/456.2 |
| 6,167,464 | A | * | 12/2000 | Kretschmann ............... 710/15 |
| 6,614,422 | B1 | | 9/2003 | Rafii et al. |
| 6,618,425 | B1 | | 9/2003 | Carlesi et al. |
| 6,940,538 | B2 | * | 9/2005 | Rafey et al. ................. 348/157 |
| 7,092,771 | B2 | * | 8/2006 | Retlich et al. ................. 700/72 |
| 7,245,271 | B2 | * | 7/2007 | Nixon et al. ................. 345/2.1 |
| 7,269,463 | B2 | * | 9/2007 | Nagatsuka et al. ............ 700/17 |
| 7,367,028 | B2 | * | 4/2008 | Kodosky et al. ............ 717/177 |
| 2003/0061295 | A1 | * | 3/2003 | Oberg et al. ................ 709/208 |
| 2005/0244047 | A1 | * | 11/2005 | Kern et al. .................. 382/141 |

OTHER PUBLICATIONS

Bellamine et al., A Remote Dignosis System for Rotating Machinery Using Virtual Reality, May 5, 2005, IEICE Trans. Inf. and SYST., vol. E88-D, p. 984-903.*

* cited by examiner

*Primary Examiner*—Kidest Bahta
(74) *Attorney, Agent, or Firm*—Venable LLP; Eric J. Franklin

(57) ABSTRACT

A method to generate technical information about a device or process by recognizing the identity of a device or process, retrieving a stored image dependent on the device, combining the stored virtual image together with an image of a real device object, displaying the combination on a display and providing a virtual control HMI means to the user for monitoring and/or controlling the device or process. A graphical user interface, computer program and a system are also described.

40 Claims, 3 Drawing Sheets

METHOD TO GENERATE A HUMAN MACHINE INTERFACE

CROSS-REFERENCE TO RELATED APPLICATIONS

The present invention claims priority from U.S. provisional patent application No. 60/637,868 filed Dec. 22, 2004.

TECHNICAL FIELD

The present invention concerns a method and system to generate a human machine interface for monitoring and/or control of an industrial process or device. The invention may be applied in many fields such as oil and gas, electricity generation, transmission, distribution as well as in industry. The invention may be applied to monitoring, control and/or programming of an industrial robot for robotic and automated applications.

BACKGROUND ART

A technician or a field operator, e.g. in a process plant, manufacturing installation, at off-shore platform or an electrical power transmission or distribution installation or substation, needs both to interact with systems or devices in the installed equipment, and to have access to information and documentation about the installed equipment. Various user interfaces, both physical and software interfaces, for the installed equipment, operating devices and systems and so on are often designed differently so that the field operators have to learn how to use a multitude of different user interfaces. The different equipment interfaces may also often be inconsistent with respect to each other.

The field operator, as well as interacting with installed equipment or devices or systems, needs access to documentation of some kind, which may be a manual, historical data, maintenance history & repair reports and the like. Even though the trend is that parts of such documentation has become electronically available, it is often stored in different systems and at different locations. Therefore, the field operators either have to plan information gathering for their work tasks in advance, or they have to interrupt ongoing tasks in order to find and then access support information and documentation for the installed equipment, process or device.

As an example within manufacturing installations, a production line may include several robots, which are usually controlled by separate controllers and/or Teach Pendants. The operator at some point needs to interact with the robots, in order to check a status, for example, inspect operational parameters for the robots or to make a new robot control program. A general drawback is that the operator must change interaction device, in this case switch to another controller or another teach pendant for each robot in succession, even though several robots may be arranged to perform a task together.

Augmented Reality (AR) is a method of overlaying real world representations with computer-generated graphics. Ideally, for vision-based augmented reality, the computer-generated graphics are combined with real world images in a way in which the user will not be able to recognize any difference between the real and the computer-generated graphics. The user will get a perception of the real world environment which is improved by the presence of added visual images.

Augmented reality techniques are used today in a number of applications. Examples of use are within media, for example weather reporting, medicine, for example visualization of internal organs, for collaborative environments, for example virtual meeting rooms, and in the aircraft industry for combinations of real world images and other information on head-up displays and/or in flight simulator projections.

Handheld and wearable control panels with interaction possibilities already exist and interest in such devices is increasing. The use of mobile phones and PDAs as the interface towards systems or devices is known. Also, tablet PCs, which have been used, e.g. within hospitals, provide an interface that the user easily carries around and interacts with by touching the screen.

A newly introduced device is that of virtual keyboards. An image of a keyboard, a virtual keyboard, is projected, onto e.g. a table, and may typically be the input means for a computer of some sort. The user touches or presses the keys of the image, the virtual keyboard, and the an associated system recognizes the specific keys touched as though the user had operated a standard keyboard virtual keyboards are available as commercial products offered by several manufacturers, e.g. Canesta, Senseboard Technologies and Samsung.

U.S. Pat. No. 6,614,422 entitled Method and apparatus for entering data using a virtual input device; discloses digital user input to a companion system such as a PDA, a cell telephone or an appliance device, using a virtual input device such as an image of a keyboard. A sensor captures three-dimensional positional information as to location of the user's fingers in relation to where keys would be on an actual keyboard. This information is processed with respect to finger locations and velocities and shape to determine when a virtual key has been struck. The processed digital information is output to a companion system.

U.S. Pat. No. 6,618,425 entitled virtual laser operator; discloses a laser controller comprising a virtual laser operator. A laser controller interconnected with an electrical discharge laser communicates with a remote computer incorporating a display screen that emulates a conventional keyboard. The display screen has a plurality of images of keys, virtual keys, each emulating a physical key of a conventional keyboard. A keystroke is typically carried out by the operator manually pressing the position of a corresponding virtual key on a touch-sensitive screen, or alternatively by actuating a conventional pointing device.

SUMMARY OF THE INVENTION

A primary aim of the present invention is to provide a method to generate additional information to and interaction with existing plant information for the operator in the field using Augmented Reality techniques for use in identifying a control strategy to use to control an industrial automation process.

A secondary aim of the present invention is to provide additional information in the form of graphic information manipulate-able by an operator to retrieve, examine and use in direct relation to a specific equipment and/or device for monitoring of and interaction with a specific equipment, plant or process. Another aim is to provide additional information in the form of graphic information manipulate-able by an operator to access, examine and carry out control actions for a specific equipment, plant or process.

The above and more aims are achieved according to the invention by a method and a system that incorporates use of the method.

According to a first aspect of the invention, a method is described for using augmented reality (AR) for generation of information to and interaction with information by the field operator, for example, in a process plant. This aspect of the invention provides solutions for function of generating and displaying virtual information in direct relation to a specific equipment and/or device for monitoring of and interaction with the specific equipment or device, and/or related part of the control system;

According to a second aspect of the invention, a method is described for displaying the AR virtual information to one or more remotely located experts for further interaction, and for further interaction with the original user or operator.

According to a third aspect of the invention, a method is described for displaying AR virtual information which generated display information the operator may use to guide him/her through the plant or process to a specific location of the specific equipment.

The general aim of this invention is to generate additional information in the form of "virtual" information about a device or process and display it to a field operator (e.g. an operator, a service technician, a maintenance person, OEM, a process engineer, etc.). First of all, in this described method relevant information is presented to the field operator for monitoring and interaction with the industrial process or device. Position information therefore is required to be retrieved, detected and/or calculated to determine whereabouts in the process the operator is currently located. Different tracking and recognition technologies may be used to carry out this function. Virtual information is generated and then overlaid on images from the real world of the process or device of interest Information related to equipment and/or devices in the process is displayed directly superimposed onto the specific equipment and/or device. Examples of equipment/device information may be on-line or off-line readings or alarms, events, such as:

'Tank level; 70%'

'Motor on'

'Alarm: Temperature is above max set point'

Further, a complete virtual control panel for monitoring and interaction can be displayed directly onto the specific equipment and/or device.

According to another embodiment of the invention, a system is described which comprises at least a tracking system, and a display (preferably a head-mounted display, wearable glasses, but may be a PDA, a tablet PC, etc.). The tracking system comprises a pointing device, or pointing and interaction device, which is used by the user or operator to point to equipment in the real world and to point to or interact with visual images, virtual and/or real in the augmented reality display.

The principal advantage of the invention is that relevant information is retrieved for a specific device or process and generated into an image provided to a user which may be examined at the same time that the user examines the device or process. The information may be as sophisticated as a virtual control panel or faceplate for the device and as simple as text information from a manufacturer handbook or fault-finding scheme.

Other advantages include that:
present virtual information in the real world is positioned and naturally attached to a device/equipment out in the process plant,
information related to a device/equipment is always in place, and available,
the information may be provided from e.g. a single source and/or be the latest most up-to-date version,
relevant, context-aware information may be presented and/or accessed in an intuitive manner,
control room functionality may be provided out in the process plant or distribution switchyard with the ability to view directly information such as real-time process parameters, implicit information e.g. calculated key performance indicators, documentation,
interaction or issuing a control action to the equipment or device may be provided via a virtual faceplate or virtual control panel,
there is no need for the virtual 'faceplate' itself to be rugged-used and/or intrinsically safe certified,
virtual notes and/or instructions are simply and effectively "attached" to devices,
HMI and control interfaces may easily be standardized and thus easily reconfigured by operators and other users,
sharing and interaction with application-sharing between one or more remotely located experts and the field operator is provided, with the ability for any information receiver to overlay "virtual" information during instruction by an expert information gathering by the operator or by an expert, durings explanations, discussions, and so on,
information or indications to the user to give guidance to find physical locations in the process plant are provided using virtual information (either initiated by the remote located expert or automatically by the system on request).

In addition, further and advantageous aspects of the invention are described in relation to a graphical user interface, a computer program for implementing the method and a computer program product comprising the computer program.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

Figure 1:
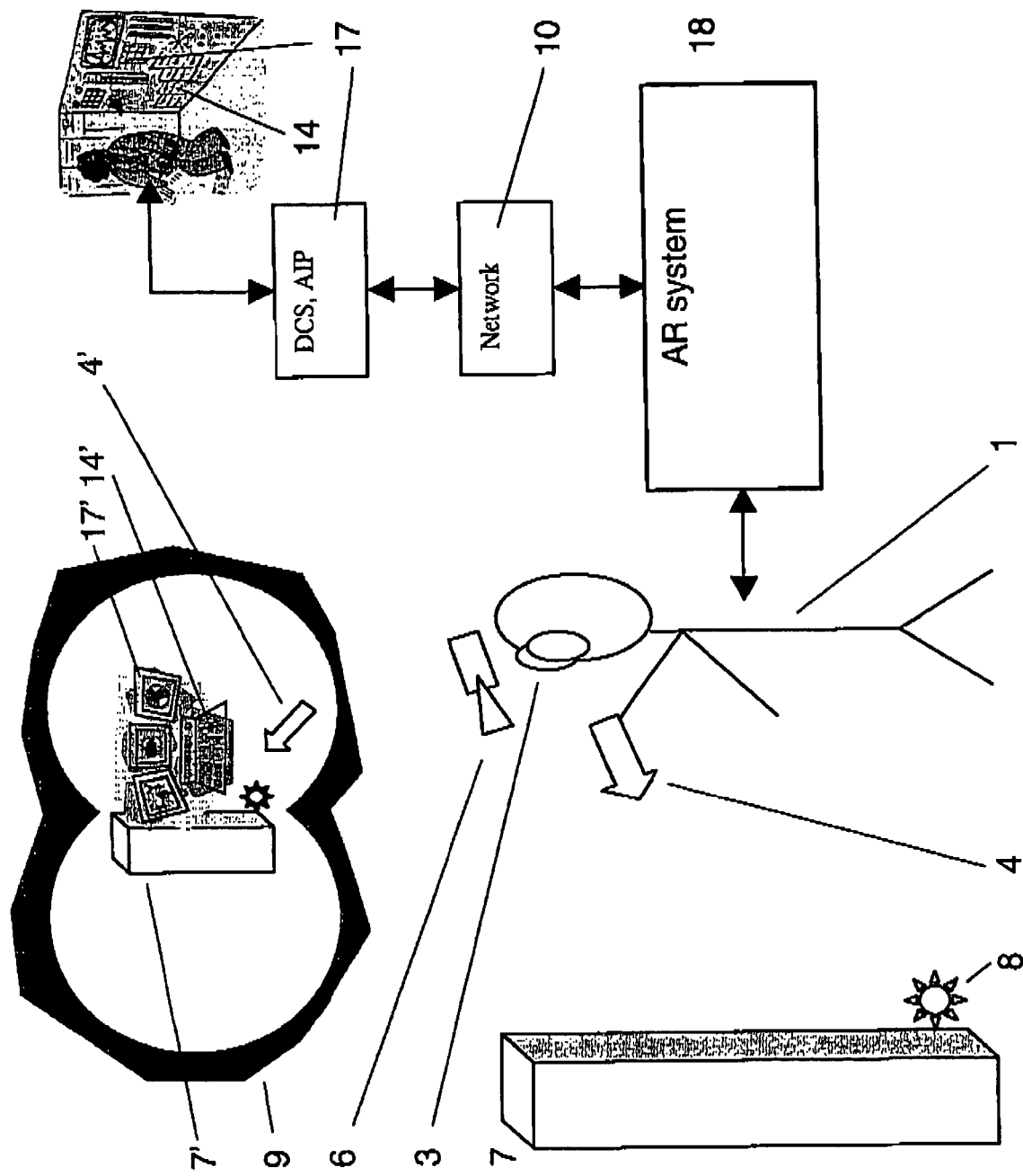
FIG. 1 is a schematic or block diagram overview of a display of a human machine interface using augmented reality according to an embodiment of the invention.

FIG. 1 shows a schematic overview in which an object 7 is approached by a user 1. User 1 has a display device 3 which may be a head mounted display. Object 7 is arranged with an identifying marker 8. User 1 is equipped with a camera, preferably a video camera, and a pointer device 4. Control equipment, which may be located some distance away from the equipment of interest, is connected to the equipment of interest (object 7) via a control system, distributed control system (DCS) or in some other way the control equipment, that may be remote, comprises information displays 17 or readouts, and one or more control switches or control panels 14.

Standing close to the equipment of interest, object 7, the user 1 sees in the display 3, a composite image 9 which includes an image 7' of a real object, a computer generated graphic image 4' of the pointer and one or more computer generated images 14' of documentation and/or graphic objects for control, such as a faceplate or a control panel 17'. The computer generated images for the equipment of interest are selected, retrieved or otherwise generated dependent on the identity of the selected object 7. The display 3 is preferably a head mounted such as glasses. The figure also shows that the user is connected in some way to an AR system 18, and via a data network 10 to a source of support documentation 14. The documentation may include text and may in particular include augmented reality objects and other graphic objects. AR system 18 comprises a tracking system or a vision system to determine the present point of view of the user, and handle inputs from a equipment identifying marker such as marker 8 and/or pointer 4; a graphics generator, and interfaces to networked support systems such as a LAN, WLAN, DCS, AIP.

Figure 2:
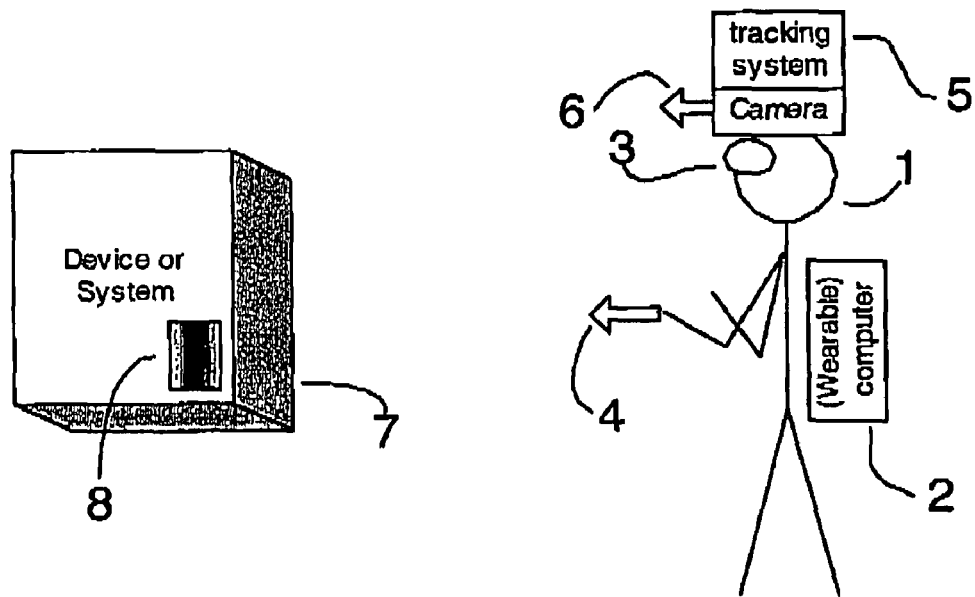
FIG. 2 is a schematic diagram for a human machine interface using augmented reality according to an embodiment of the invention.

FIG. 2 is a schematic view showing a user 1, equipped with a display device 3 such as glasses, a pointer 4 and a computer such as a wearable computer 2. The user approaches an object 7 such as a device, an equipment or system of interest which is arranged with a marker 8. The user has a camera 6 and a tracking unit 5, which in this case is vision-based.

The operator 1 walks around in the environment. The tracking system 5 recognizes known identities (IDs) of devices such as object 7 in the environment. In the case where the tracking system is vision-based, as in FIG. 2, the operator wears a camera 6 attached to his head. The camera 6 records live video of the real world. The camera 6 may also be used for the augmented reality visualization of the virtual control panel in case the "video see-through" method is used.

The virtual graphics shown schematically 9 in FIG. 1, as examples 17, 4' 14' including a virtual control panel 14' are visualized either as "optical see-through" or "video see-through" at the wearable display 3, which preferably is wearable glasses or a head-mounted display or a head-up display. As well as an ordinary optical display, it is also possible to use direct projection of virtual/computer-generated information into the eye, a virtual retinal display is an alternative when the extra complexity is justified. The user has a pointing device 4, (which is shown on the display as an image 4') for interacting with the virtual graphics, and in particular with the virtual control panel 14'. The pointing device 4 may have an integrated tracking system, for example GPS monitored, gyro-based or ultrasound based, making it possible to point at poses in the environment, track, identify the position coordinates and orientation of the pointer, and to interact with the system by means of this position information. Alternatively or as well, the camera 6 may be used to provide as vision-based tracking information for the interacting and pointing device 4.

Figure 3:
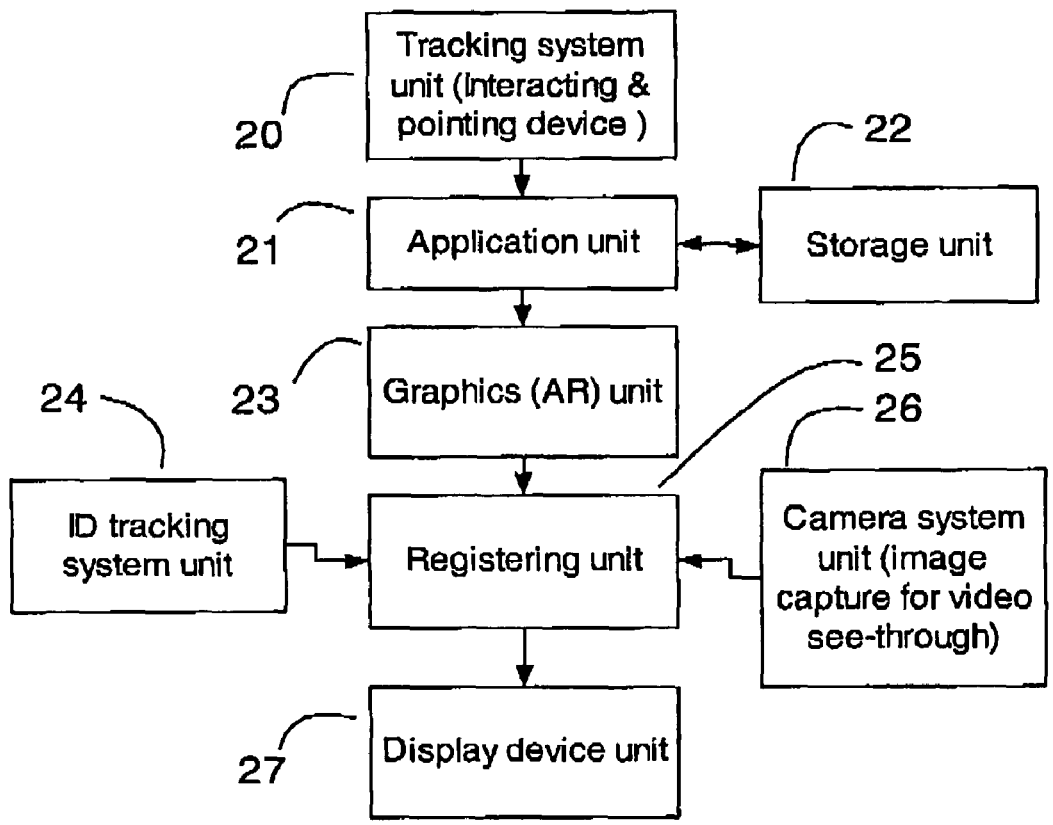
FIG. 3 is a schematic flowchart for a method of providing a human machine interface using augmented reality according to an embodiment of the invention.

FIG. 3 shows a diagram comprising a flowchart for a method according to an embodiment of the invention. It shows a Tracking system 20, an Application unit 21 and Storage unit 22, and a Graphics (AR) unit 23. The operator uses an interacting device, such as the pointer 4 of FIGS. 1, 2, which may be tracked by a tracking device, which may be a system integrated in the pointer, a vision-based system 5 such as shown in FIG. 2, or another tracking system.

Each equipment, device, instrument and system in the installation environment that the user will need to monitor and to interact with, such as represented by object 7, has some type of known ID 8 conceptually attached to them. The IDs are stored in or otherwise retrievable by the control system, so that a tracking system such as tracking system 5 may identify the specific device/system when it is examined. The tracking system 5 determines the position and orientation of the object, i.e. an equipment or device or system based in part on the known ID 8 of each item. The ID 8 is also matched to one or more corresponding computer generated information in the form of virtual graphics views such as 17', 14' stored on the storage means 22. The virtual graphics may be stored as graphical parts or components or graphical primitives which when assembled, grouped or generated form virtual images such as 17', 14'. Alternatively to the use of a tracking system as exemplified by tracking system 5, the pointing and interaction device (4) may have an integrated system that may be used to identify specific equipment, devices and systems. Another solution is to use position tracking of the user and his head to identify what he is looking at. Regardless of system used to track position, an absolute position is then mapped in terms of coordinates against stored positions of equipment, devices and systems in the control system or in an associated computer system.

The system has at least one predefined and configured set of computer generated information stored related to the specific equipment. This may comprise any of a graphical view, or interface/faceplate 14', text instructions for specific related equipment. Such graphical views, text and/or interfaces are mapped to against the known ID attached to the specific equipment/device, and/or a unique position of the user within the process plant.

A wearable computer 2 as shown in FIG. 2, or a stationary computer, may contain the software necessary in order to generate the augmented reality control panel 14' based upon the output from a tracking system such as the tracking system 5, and the video stream from the camera 6, in the case that video see-through is used. The wearable computer 2 also contains the software necessary for performing the desired monitoring, inspection, control etc. task or process the operator or other user shall carry out, e.g. two-way communication with equipment, devices, instruments, or systems, real-time data managing and visualisation. Further, the wearable computer 2 may generate the virtual graphics, which will provide the AR interface for the combined view 9 FIG. 1. In addition, the wearable computer 2 may comprise a storage media in order to save, and retrieve previously saved, information. Alternatively, the storage media may be located on a server so that the wearable computer system functions in part as a client/server solution with the wearable computer 2 having the client function or functions.

Communication of the information from the interaction and pointing device 4 to the wearable computer 2 is done through a wired or wireless link. Depending on the type of tracking system, the pose of the interacting and pointing device 4 can come from the pointing device itself, or from an external tracking system, or for example from a system such as tracking system 5. Communication with the tracking function is performed through a wired or wireless communication media, which may be done by means of optical, IR etc. or acoustic, e.g. ultrasound based devices.

According to another aspect of the invention a system is described for generating and providing virtual information directly related to selected process equipment and/or devices in process plants or other industrial or commercial installations. The system comprises:

one or more augmented reality systems comprising in turn:
a handheld interacting and pointing device and an integrated or external tracking system for determining pointer position and orientation in relation to a world coordinate system, one or more wearable display devices (glasses, head-mounted display or head-up display) for visualizing augmented reality images overlaid on one or more views of the real world. In the case that case video see-through is used for augmented reality visualization, the display device may further comprise a camera for capturing a stream of images of the environment mounted on or integrated with the display device; the camera may be mounted in a fixed position relative to the display device, for example mounted at the display device, and the display device may then be positioned along the camera view axis and at the image plane of the camera, unique IDs are provided for marking objects of interest, that is the equipment, devices and systems present in the environment.

The system may also comprise;

a recognition system for recognizing the unique IDs and a tracking system for determining the object position and orientation in relation to a world coordinate system, which tracking system may be the same system as used for tracking the position and orientation of the pointer; and/or a system for generating an augmented reality representation 14', 17' of computer-generated graphical information, generated and stored in advance, for overlay on a real world image, and/or a communication system supporting voice communication and transfer of the entire, or parts of, augmented reality interface and/or additional virtual information.

The system can be configured in different ways. The augmented reality may be applied, visualized, in at least two different ways: Video see-through, Optical see-through.

Video see-through uses a camera to capture a live video stream of the environment, or a least a series of still images, corresponding to the user's view of the world. The system combines computer-generated graphics 14', 4', 17' with the live video stream and projects the combined augmented reality video and image 7' of real object 7 on the display device. The user will see the video with virtual information overlaid as if he/she was looking at the real world.

In the case of an optical see-through arrangement, the computer-generated graphics are registered directly onto the display device and follows the user's view of the real world. The virtual graphics are combined with, or overlaid on, the real world without including a video of the real world. The video see-through arrangement tends to be less demanding regarding the frame rate.

As noted above, FIG. 2 shows a user 1, with a display device 3 such as glasses, a pointer 4 and a computer such as a wearable computer 2. The user approaches an object 7 of interest, such as a device, an equipment or system which is arranged with a marker 8. The user has a camera 6 and a tracking unit 5.

Basically, at least two tracking functions are needed for generating the process/device information visualization and interaction system. This is in addition to a recognition system required for recognizing identifying markers marking the devices/processes in the environment, which markers are then matched to each ID.

The first tracking function traces and determines the position and orientation of the interacting and pointing device 4 and/or the position of the field operator 1, whereas the second tracking function traces and determines an ID for an at equipment, device or system in the process plant. These tracking functions may be comprised in a single tracking system used for tracking both, or as a plurality of tracking systems. A vision-based tracking system including a camera mounted on, or integrated with, the display device is one solution which may be combined with AR visualization based on video see-through.

Position and orientation of the pointing and interacting device may be determined in a number of different ways. For example there may be a tracking system based on sound, e.g. ultrasonic tracking systems, magnetic tracking systems, optical systems, and/or tracking systems based upon inertial navigation by means of accelerometers and/or gyros. A tracking system may also be based on detecting a physical position etc of mechanical arms; and there are vision-based and optical systems and hybrid systems combining some of the technologies previously mentioned. For some of the tracking systems, the interacting and pointing device 4 may have integrated sensors for determining positions and orientations. Such sensors may, for example, be gyros, inertial sensors and/or accelerometers. The point of origin, or origo of the world coordinate system is preferably defined to correspond with the position of the display device 3. As the camera 6 is preferably mounted on, or integrated with, the display device 3, the relative position of the camera to the display device is known. Hence, the system can determine the poses of the interacting and pointing device 4 in relation to the camera/display device system. As an alternative to a pointer, a hand or finger of an operator may be used, especially if it is identified or marked in some way, e.g. by a ring or bracelet or similar. The hand, arm or finger etc may then be tracked as the pointer would be.

The system needs to recognize the predefined IDs in the environment. These IDs are attached to identify each instance of equipment, device, instrument and system, which the operator could want to interact with. Another solution for position-based identification of ID for a machine/process is to determine the position of the field operator and his/her head and to compare this position with predefined positions of relevant equipment and devices within the process plant. In that case, the tracking system may be arranged for tracking only the field operator's interacting and pointing device. Alternatively to tracking systems as described above for determining the position of a machine/process ID in the environment, different marker technologies can be used for the recognition such as RF tagging, bar codes, ultrasound, radio signals, optical signals and/or GPS.

As described above the engineer, technician or field operator wears either a head-mounted display 3, or glasses (HMD), or else carries or wears a mobile display which may be a tablet PC, a Teach Pendant or a PDA. Such a display functions as the 'view' of the augmented world.

The application unit 21 contains the necessary software in order to perform the desired process or task, e.g. integrate real-time data with recognized device/system, and perform actions based on input from the interacting and pointing device. The tracking system will make it possible to trace the pose of the interacting and pointing device 4 in 3D, and can also be used for specifying the world coordinate system. The interacting and pointing device can also be used for additional tasks such as to drag a virtual control panel, or other virtual information, from the handheld ID to a specific device/system and to locate, select, show, etc. new positions in the environment. Further, the application unit holds information regarding the coordinate systems. Hence, the application unit 21 is dependant on the specific system/environment.

The operator uses an interaction and pointing device 4 which are tracked by a tracking system 20 which may be integrated with the interacting and pointing device. The user uses the interacting and pointing device 4, 4' for interacting with the virtual control panel 14' and for pointing 4 in the environment.

Figure 4:
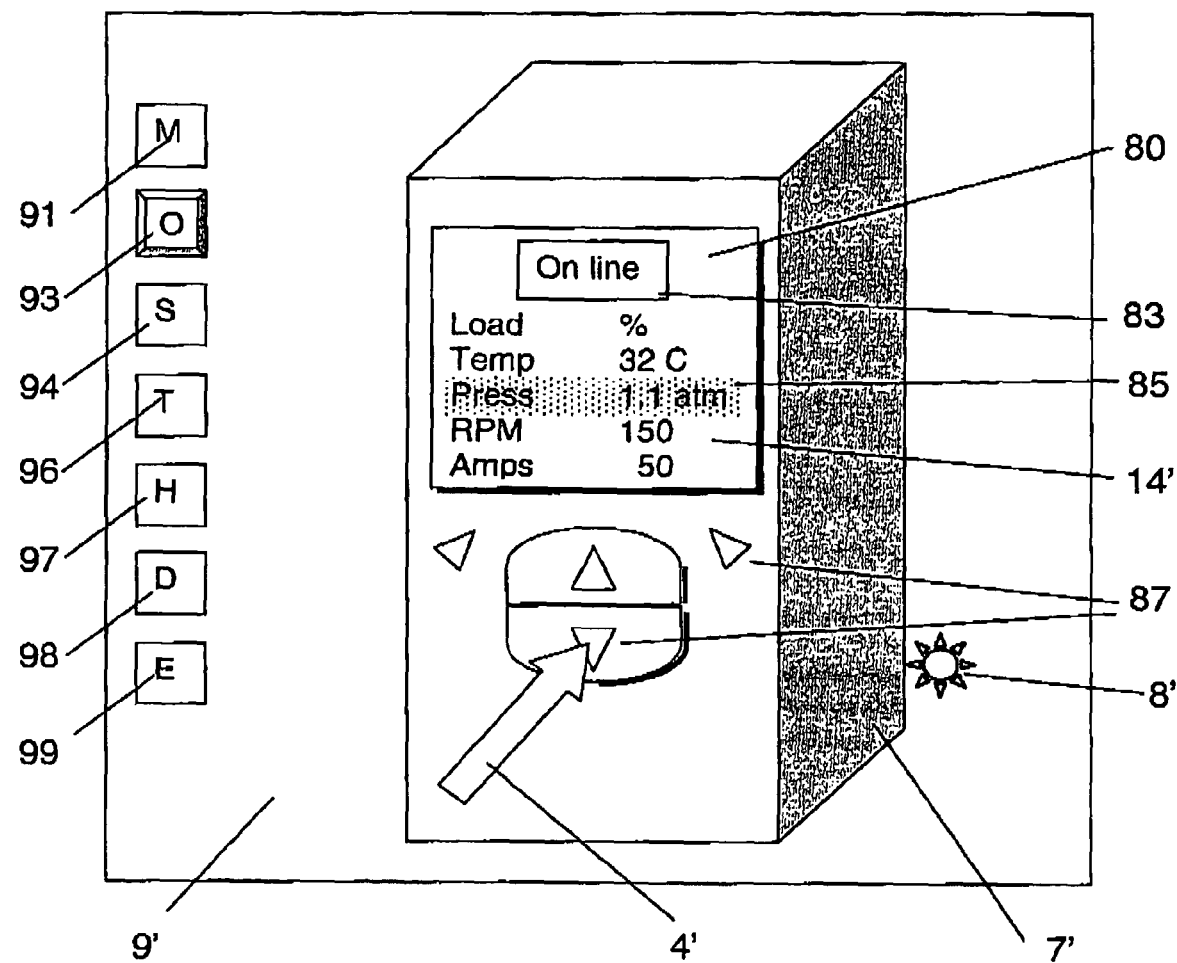
FIG. 4 is a schematic or block diagram overview of a display for a human machine interface using augmented reality according to another embodiment of the invention.

FIG. 4 shows a display according to another embodiment. It shows an augmented reality display 9', an image 7' of the object (7, FIG. 1) and an image 4' of the pointer (4, FIG. 1). It also shows an image of a graphic of a control panel 14', or virtual faceplate, superimposed on the image 7' of the object. The control panel may consist of a display part 80 which may show a menu main item text 83 or a graphic, and for example On-line readings such as different measurements, sensor outputs, temperature, pressure, rpm, current, voltage, phase angle and so on. The control panel may also have two to four control buttons, like buttons 85 which may be used to manipulate items or menu items shown in the display 80 of the control panel 14'. The control panel display may be manipulated by "pressing" an image of a button 87 with the image 4' of the pointer, by means of that the operator moves the real pointer in space which results in that the tracking and graphics systems move the virtual pointer image 4' on the augmented reality display 9'. An item on the display may be selected, 83, and buttons 87 etc operated to access more information etc. Other selections may be made to call up a menu, select from a menu other items such as Stored data, Trends, maintenance History, Documentation, or contact an Expert.

Other control functions may be displayed on the display 9'. These may be in the form of images or icons or buttons to carry out a control function directly, or to manipulate the the display 9' in some way. In particular short cut icons may be displayed such as 91 Menu, 93 On-line measurements, 94 Stored operations data, 96 Trends in operations data, 97 maintenance History, 98 Documentation, or 99 contact an Expert. Such other graphic images 91-99 overlaid on the augmented reality display may be selected and activated by movements of the real pointer 4 which then drives the image 4' of the virtual pointer.

The graphics unit 23 generates a 3D graphical representation of the visual information that is to be displayed in relation to the user's ID (999). This graphics unit holds a specification of the 3D graphical primitives to be visualized. The graphics unit 23 receives information from the application unit 21 regarding the virtual graphical information to be displayed, based on user input and object ID and/or user position and orientation. All graphical primitives positions are preferably specified in relation to the world coordinate frames. For the robot programming application relevant visual information may be operator-specified waypoints, the actual robot path, task specific information etc. Programming of robot paths an use of waypoints is described in a published PCT application WO 03/99526 A1 entitled A method and a system for programming an industrial robot, which document is hereby incorporated in this specification in full by means of this reference. The graphical representations in the graphics module are transmitted to the registration unit 25.

The registering unit 25 or registration unit combines the virtual graphics from the graphics unit 23 with the real world view. In case the video see-through method is used, a live video of the real world image from the camera system unit 26 is captured and combined with the graphical representation from the graphics unit 23. The registering unit 25 uses the pose data from the ID tracking system unit 24 in order to overlay the real world images with the computer-generated graphics into a correct position relative to the real world images. With the registration correctly done, the computer-generated graphics are virtually "attached" to the real world scene.

In the case of video see-through, a camera unit 6 attached to the display device 3, 27 produces real world images. The pose of the camera and display is determined according to the world coordinate frame, and the pose is used by the registering unit 25 in order to overlay the real world scene with computer-generated graphics from the graphics module 23. The combined images are displayed on the display device 3, 27. Alternatively, the registering unit 25 overlays the real world with the computer-generated graphics in an optical see-through arrangement.

A memory storage unit 22, a data server or other memory means, enables saving and loading of application related information, e.g. application related information, graphical interfaces for the various devices/systems, and system configuration parameters e.g. local and/or world coordinate frame.

According to a second preferred embodiment of the present invention the operator or a user 1 approaches a specific equipment/device/process for which he is interested in obtaining further information or to interact with, object 7. The system then automatically determines the user's position within the process plant, which may be done either by recognizing which equipment or device the user is standing in front of, or next to; or by recognizing the position of the user and his head in relation to the plant and the predefined positions of equipment, devices and systems within the plant. A coordinate system is specified for graphically synchronizing, sometimes described as registration of, the virtual graphics with the image of the real world. In the case where unique markers 8 are attached to equipment, devices, instruments and systems, a relative and local coordinate system exists for each device. Virtual graphics may be synchronized in relation to this local coordinate system. In the case where the absolute position of the field operator and his head is used, an absolute coordinate system, a world coordinate system is defined and the virtual graphics are synchronized in relation to the world coordinate system.

The system displays predefined views similar to that shown 9, FIG. 1, consisting of one or more computer-generated graphics 14', 17', 4' projected or otherwise superimposed directly onto an image of the specific equipment or device 7'. On the display 3, the user sees the virtual information attached to the equipment, device, instrument or system. The virtual information/graphics may for example represent readings such as real-time process parameters, temperatures, pressures and so on; and/or events, warnings and/or alarms; the computer generated graphics may display a virtual control panel 14' or virtual faceplate for interaction with the equipment, device, instrument or system; may display documentation; or a combination from documents and the above graphics.

According to a third preferred embodiment of the present invention a user operates the system by wearing/holding the augmented reality system including a display and a pointing and interaction device. Video see-through is used to generate and present an AR world at the display device. The camera integrated with the display device is used to capture a live video stream of the real world. The camera is located in relation with the display in such a way that it provides the same view as the user would get by looking "through" the display device. The live video stream combined with computer-generated graphics is presented in real-time at the display device. Additional functionality includes camera zooming with output of the actual camera focal length. This will enable the system to display the computer-generated graphics correctly while zooming. The camera and/or the camera focal length output may also be used for vision-based tracking if vision-based tracking is used as the tracking system.

The pointing and interaction device tracking system tracks the position of the pointing device, in relation to the local or world coordinate system. The position of the operator's pointing device is used, for example, to render computer-generated graphics on a head up or handheld display device and to recognize interaction, selection or pointing to the virtual graphics, and especially the virtual graphics representing a virtual control panel 14' or other control functions.

The user performs the desired process, e.g. to monitor information, to navigate through different virtual views and/or to interact with the virtual control panel. During the execution of the specific task, process related information is generated and visualized by means of the computer-generated 3D graphics directly onto equipment, device, instrument or system. The graphics are overlaid on the real world representation from the integrated camera. When the user moves around or moves his head, the virtual graphics are generated and/or adjusted so as to appear to be positioned at the same location at the specific equipment, device, instrument or system, although the point view of the combined object and graphics may have changed.

In addition to displaying virtual information directly related to a specific equipment and/or device for monitoring of and interaction with the specific equipment or device and/or the control system, in a preferred embodiment the displays provided by the system and methods are communicated to other users. The displays are shared so that the user may also interact with local or remotely located experts. User functions are expanded, dependent for example on ID of the person or persons logged-on, so that the other users or remote experts can attach virtual notes or other graphic devices to the view seen in display 3 by the operator.

The virtual information includes a graphic image 4' of the pointer 4, as in the user view 9 of FIG. 1. This pointer is may be displayed or overlaid into any part of the plant or process, dependent on the current location of the operator. By examining a relative position of the graphical image 4' of the pointer overlaid on plant schematics, process schematics, plant layout, control system view etc. and a desired selected device/process somewhere in the plant/process, the user or may use the graphical image 4' of the pointer as a location guide or route guide through the plant process to a specific location in the plant. That is, the user may use the system to locate and find his way to a device/object of interest. Other variations of the principles of the invention as disclosed here may be practised. One or both of pointer 4 and camera 6 may comprise a wireless transmitter, and wireless receiver, or may for example be wireless radio transceivers (transmitter-receivers). Wireless communications may be carried out using any suitable protocol. Short range radio communication is the preferred technology, using a protocol compatible with, standards issued by the Bluetooth Special Interest Group (SIG), any variation of IEEE-802.11, WiFi, Ultra Wide Band (UWB), ZigBee or IEEE-802.15.4, IEEE-802.13 or equivalent or similar.

Generally a radio technology working such as a state of the art radio communication technologies, e.g. frequency hopping, spread spectrum, ultra wideband etc., using any suitable frequency band such as the 2.4 GHz or 5 GHz band or higher, with significant interference suppression means, for example by spread spectrum technology, frequency hopping and so on is the preferred type of wireless communication. For example a broad spectrum wireless protocol in which each or any data packet may be re-sent at other frequencies of a broad spectrum at around 7 times per millisecond, for example, may be used, such as in a protocol developed by ABB called Wireless interface for sensors and actuators (Wisa). However one or more wireless communication may alternatively or also be carried out using Infra Red (IR) means and protocols such as IrDA, IrCOMM or similar. Wireless communication may also be carried out using sound or ultrasound transducers.

The methods and system mentioned in relation to embodiments of the present invention may applied to operations such automobile assembly and to manufacturing processes used in automobile manufacturing. A robot or automation application including a robot may for example be programmed to carry out any of; welding, soldering, electrical soldering, riveting, fettling, painting, spray painting, electrostatic powder spraying, gluing, operations performed in relation to metal processing processes such as continuous casting, casting, diecasting and production methods for other materials such as plastic injection moulding, compression and/or reaction moulding or extrusion. A robot application may be programmed to carry out other operations, including such as folding plate, bending plate and/or hemming plate. The robot application may comprise a plurality of tools, both specialised tools for welding, painting etc as well as other more general devices, grippers, claws, manipulators and so on that carry out manipulation-type tasks such as holding, placing, pick and place, and even packing of components or subcomponents in a container.

One or more microprocessors (or processors or computers) comprise a central processing unit CPU performing the steps of the methods according to one or more aspects of the invention. This is performed with the aid of one or more computer programs, which are stored at least in part in memory accessible by the one or more processors. The or each processor may be located at least in, or arranged connected to, computer or wearable computer 2, it is to be understood that the computer programs carrying out methods according to the invention may also be run on one or more general purpose industrial microprocessors or computers, or on one or more specially adapted computers or processors, FPGAs (field programmable gate arrays) or ASICs (application specific integrated circuits) or other devices such as simple programmable logic devices (SPLDs), complex programmable logic devices (CPLDS), field programmable system chips (FPSCS). The computer programs described may also be arranged in part as a distributed application capable of running on several different computers or computer systems at more or less the same time.

A part of the program may be stored in a processor as above, but also in a ROM, RAM, PROM, EPROM or EEPROM chip or similar memory means. The program in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony Memory Stick™ and other removable flash memories used in digital cameras etc, phones, or removable hard drives etc. may also be used. The program may also in part be supplied from a data network 10, which may in part or temporarily comprise a public network such as the Internet.

It should be noted that while the above describes exemplifying embodiments of the invention, there are several variations and modifications which may be made to the disclosed solution without departing from the scope of the present invention as defined in the appended claims.

The invention claimed is:

1. A method to generate a human-machine interface for a user to monitor or control of an industrial or commercial device or process, the method comprising:

receiving with a portable computing device carried by the user information of an identity of said industrial device or process or equipment in the vicinity of the user, matching with said portable computing device said industrial device to control system data or process or equipment, retrieving with the portable computing device at least one stored virtual image dependent on the identity of said industrial device or process or equipment, capturing an image of a real object with an imager carried by the user, combining with the portable computing device the at least one stored virtual image together with said image of a real object, displaying the combination on a display, displaying on a portable display associated with the portable computing device a virtual control human-machine interface for monitoring and/or controlling said industrial device or process or equipment, the human machine interface comprising at least one of information or manipulatable element superimposed on the image of a real object, and controlling said industrial device or process in response to manipulation the user of the at least one of information or manipulatable element superimposed on the image of a real object.

2. The method according to claim 1, further comprising:
selecting said industrial device or process or equipment by the user moving or directing a pointer, and tracking with a tracking device carried by the user a position in space of the pointer.

3. The method according to claim 2, further comprising:
selecting said industrial device or process or equipment by the user moving or directing the pointer in a field of view of the camera, and photographing with the imager the position and/or movement of the pointer.

4. The method according to claim 3, further comprising:
selecting a part of said industrial device or process or equipment or at least one stored virtual image by the user moving or directing the pointer, and tracking with a tracking device carried by the user the position of the pointer so as to move or manipulate a computer generated image of the pointer shown on the display.

5. The method according to claim 1, further comprising:
retrieving with the portable computing device status information or condition information for a part of said industrial device or process or equipment dependent on manipulation by the user of the virtual control human-machine interface.

6. The method according to claim 1, further comprising:
generating a control action for a part of said industrial device, or process or equipment dependent on manipulation by the user of the virtual control human-machine interface.

7. The method according to claim 1, further comprising:
detecting with a tracking device a position of a head of the user or other operator, and calculating a position and orientation and/or a real world coordinate position.

8. The method according to claim 2, further comprising:
calculating a position and orientation and/or a real world coordinate position of said industrial device or process or equipment by image output from the imager.

9. The method according to claim 8, further comprising:
calculating a position and orientation and/or a real world coordinate position with a focal length output from the imager.

10. The method according to claim 2, further comprising:
selecting said industrial device or process or equipment by the user moving or directing a pointer, and tracking the position in space of the pointer using a technology based on any of ultrasound, visible light, infra red light, a GPS system, a mechanical linkage.

11. The method according to claim 1, further comprising:
matching the identity of said industrial device or process or equipment to a physical location of said device or process or to a location embodied as a software entity in a control system for said device or process.

12. The method according to claim 8, further comprising:
matching the identity of said industrial device or process or equipment to part of a known image of said industrial device or process or equipment.

13. The method according to claim 8, further comprising:
detecting a sign, mark or visual code, and matching the recognized sign, mark or visual code to a stored data location and/or a coordinate comprising said industrial device or process or equipment.

14. The method according to claim 8, further comprising:
detecting an optical, radio or sound signal radiating from a selected part of said industrial device or process or equipment, and matching the recognized signal to stored location and/or coordinate data comprising said industrial device or process.

15. The method according to claim 8, further comprising:
determining a pose or orientation and/or direction of interest of the user, and calculating the location of said industrial device or process or equipment to from a physical location in a or from a location in a virtual plant.

16. The method according to claim 8, further comprising:
identifying said industrial device or process or equipment, determining a position of the user, calculating the location of said industrial device or process or equipment relative the position of the user, and providing a graphic orientation physical location of a location in a virtual plant.

17. The method according to claim 1, further comprising:
matching with stored data a marker that is visible, and identifying said industrial device or process or equipment by recognition of one or more numbers and/or letters or coded numbers and/or letters.

18. The method according to claim 17, further comprising:
matching with stored data a marker that is visible, and identifying said industrial device or process or equipment by recognition of one or more numbers and/or letters encoded in a visible image.

19. The method according to claim 1, further comprising:
matching an image of said industrial device or process or equipment to stored data, and identifying said industrial device or process or equipment with an image recognition module.

20. The method according to claim 15, further comprising:
calculating a position of the pointer, matching the position to a location in a representation of the plant, and showing the graphic representation of the pointer overlaid on the representation of the plant.

21. A computer program product, comprising:
a computer readable medium; and
computer program instructions recorded on the computer readable medium and executable by a processor for carrying out a method comprising
receiving with a portable computing device carried by the user information of an identity of said industrial device or process or equipment in the vicinity of the user,
matching with said portable computing device said industrial device to control system data or process or equipment,
retrieving with the portable computing device at least one stored virtual image dependent on the identity of said industrial device or process or equipment,
capturing an image of a real object with an imager carried by the user,
combining with the portable computing device the at least one stored virtual image together with said image of a real object, displaying the combination on a display,
displaying on a portable display associated with the portable computing device a virtual control human-machine interface for monitoring and/or controlling said industrial device or process or equipment, the human machine interface comprising at least one of information or manipulatable element superimposed on the image of a real object, and
controlling said industrial device or process in response to manipulation the user of the at least one of information or manipulatable element superimposed on the image of a real object.

22. A system for generating a human-machine interface for a user to use to monitor or control of an industrial or commercial device or process, comprising one or more augmented reality systems, each comprising:
a detecting module configured to detect an identifying marker,
a matching module configured to match the identified marker to said industrial or commercial device or process,
a handheld interacting and pointing device comprising a tracking system for determining a position and orientation of the interacting and pointing device in relation to a world coordinate system,
a graphic manipulation system for generating at least one stored virtual image arranged with computer program means for control of monitoring and/or control functions, the graphic manipulation system comprising manipulatable elements,
a camera for capturing an image of a real object, and
a wearable display device for visualizing an augmented reality display comprising the graphic manipulation system superimposed on said image captured by the camera of a real object of a part of said industrial or commercial device or process.

23. The system according to claim 22, wherein the handheld interacting and pointing device is configured to select said industrial or commercial device or process and to determine a position of the pointer, and wherein the handheld interacting and pointing device comprises a sensor integrated or built in to the pointer.

24. The system according to claim 22, wherein the handheld interacting and pointing device is configured to select said industrial or commercial device or process and determine a position of the pointer, and wherein the handheld interacting and pointing device comprises a camera operated by the user.

25. The system according to claim 22, wherein the handheld interacting and pointing device is configured to select said industrial or commercial device or process and determine a position of the pointer, and wherein the handheld interacting and pointing device comprises a camera operated by the user and the handheld interacting and pointing device.

26. The system according to claim 22, wherein the handheld interacting and pointing device is configured to select said industrial or commercial device or process and determine a position of the pointer, and wherein the handheld interacting and pointing device comprises a technology based on any from the list of: ultrasound, visible light, infra red light, a GPS system, a mechanical linkage.

27. The system according to claim 22, further comprising:
one or more computer program modules for determining a position of a pointer in the real world and means for calculating a position of the pointer on a display for an image of the real world pointer.

28. The system according to claim 22, wherein the wearable display device is arranged in a known position relative the camera or integrated with the camera.

29. The system according to claim 25, further comprising:
an image capture system unit or camera system for a video see-through system arrangement.

30. The system according to claim 22, further comprising:
an identifying marker arranged relative to said industrial or commercial device or process.

31. The system according to claim 30, further comprising:
an identifying marker comprising any from the list of: numerical sign, alphanumeric sign, coded alphanumeric sign, machine readable visible sign, bar code, visual sign embodying encoded alphanumeric information.

32. The system according to claim 30, further comprising:
an identifying marker comprising a signal comprising any from the list of: IR detector or emitter, ultrasound emitter, sensor for a laser beam, wireless radio transmitter and receiver.

33. The system according to claim 22, further comprising:
a tracking module configured to detect a position of a head of the user, or other operator, and
a calculator configured to calculate a position and orientation and/or a real world coordinate position of the user.

34. The system according to claim 22, further comprising:
an application unit comprising software modules configured to integrate real-time data and/or graphics with an image of an identified said industrial device or process.

35. The system according to claim 22, further comprising:
a registration unit comprising software and/or hardware modules configured to overlay real world images with the computer-generated graphics for an optical see-through arrangement.

36. The system according to claim 22, further comprising:
a communication module configured to support voice communication and/or of parts or all of an augmented reality interface and/or additional virtual information for a plurality of users.

37. The system according to claim 36, further comprising:
a computer program module for one or more other logged-on users to manipulate the augmented reality display.

38. The system according to claim 36, further comprising:
a computer program module for one or more other logged-on users to attach text or graphic annotations to an image comprised in the augmented reality display.

39. The system according to claim 22, further comprising:
a computer program module and database module for handling information from documentation or other sources.

40. The system according to claim 22, wherein a hand or finger of the user is arranged configured in the system as an interacting and pointing device and/or arranged with a ring, collar, bracelet or other identifying object.

* * * * *